US009651655B2

(12) United States Patent
Feldman et al.

(10) Patent No.: US 9,651,655 B2
(45) Date of Patent: May 16, 2017

(54) POSITIONING ENHANCEMENT THROUGH TIME-OF-FLIGHT MEASUREMENT IN WLAN

(71) Applicant: AUTOTALKS LTD., Kfar Netter (IL)

(72) Inventors: Ariel Feldman, Ra'anana (IL); Alex Kobzancev, Tel-Aviv (IL); Leonid Menis, Hertzliyah (IL); Onn Haran, Bnei Dror (IL)

(73) Assignee: Autotalks Ltd., Kfar Netter (IL)

( * ) Notice: Subject to any disclaimer, the term of this patent is extended or adjusted under 35 U.S.C. 154(b) by 95 days.

(21) Appl. No.: 14/922,720

(22) Filed: Oct. 26, 2015

(65) Prior Publication Data

US 2016/0195600 A1 Jul. 7, 2016

Related U.S. Application Data

(60) Provisional application No. 62/099,476, filed on Jan. 3, 2015.

(51) Int. Cl.
*G01S 5/02* (2010.01)
*G01S 19/51* (2010.01)
(Continued)

(52) U.S. Cl.
CPC .............. *G01S 5/0289* (2013.01); *G01S 5/14* (2013.01); *G01S 13/767* (2013.01);
(Continued)

(58) Field of Classification Search
CPC ........ G01S 5/0289; G01S 5/14; G01S 13/767; G01S 13/878; G01S 19/51; H04W 64/00; H04W 84/12
See application file for complete search history.

(56) References Cited

U.S. PATENT DOCUMENTS 9,237,546 B1 *  1/2016  Zhang ................... H04W 64/00
9,261,580 B2 *  2/2016  Banin ................... G01S 5/0205
(Continued)

FOREIGN PATENT DOCUMENTS

WO    2014193477 A1   12/2014

OTHER PUBLICATIONS

Andre Gunther and Christian Hoene; "Measuring Round Trip Times to Determine the Distance between WLAN Nodes" in NETWORKING 2005: Networking Technologies, Services, and Protocols; Performance of Computer and Communication Networks; Mobile and Wireless Communications Systems pp. 768-779. 2005.
(Continued)

*Primary Examiner* — Duc C Ho
(74) *Attorney, Agent, or Firm* — Nathan & Associates Patent Agents Ltd; Menachem Nathan

(57) ABSTRACT

Method and system for obtaining positioning of nodes in a wireless local access network (WLAN), comprise, by an initiator node of the WLAN, calculating a compensated time-of-flight (ToF) of messages exchanged between the initiator node and a target node and calculating a distance of the target node relative to the initiator node using the compensated ToF, thereby obtaining relative positioning between the initiator and target nodes. The compensated ToF is calculated using OFDM symbol slope inputs measured at the initiator and target nodes. Each node is associated with an enhanced WLAN unit adapted to measure and calculate the compensated ToF.

20 Claims, 8 Drawing Sheets

(51) Int. Cl.
    *H04W 64/00*    (2009.01)
    *G01S 5/14*     (2006.01)
    *G01S 13/76*    (2006.01)
    *G01S 13/87*    (2006.01)
    *H04W 84/12*    (2009.01)

(52) U.S. Cl.
    CPC ............ *G01S 13/878* (2013.01); *G01S 19/51* (2013.01); *H04W 64/00* (2013.01); *H04W 84/12* (2013.01)

(56) References Cited

U.S. PATENT DOCUMENTS

| | | | | |
|---|---|---|---|---|
| 2012/0032855 | A1* | 2/2012 | Reede | G01S 5/0289 342/458 |
| 2014/0206382 | A1* | 7/2014 | Shabtay | G01S 5/0289 455/456.1 |
| 2015/0350936 | A1* | 12/2015 | Qi | H04W 24/02 370/252 |
| 2015/0382152 | A1* | 12/2015 | Lindskog | H04L 5/0055 455/456.2 |
| 2016/0231414 | A1* | 8/2016 | Steiner | G01S 19/11 |

OTHER PUBLICATIONS

Alan Bensky "Wireless Positioning Technologies and Applications", Artech House. 2007.
Alejandro Ramirez "Time-of-flight in Wireless Networks as Information Source for Positioning", PhD thesis, 2011.
Lorenz Schauer et al; "Potentials and Limitations of WIFI-Positioning Using Time-of-Flight" International Conference on Indoor Positioning and Indoor Navigation (IPIN), pp. 1-9, 2013.

* cited by examiner

A) Delayed update

B) Aggregated delayed update

C) Instant update

D) Implicit update

POSITIONING ENHANCEMENT THROUGH TIME-OF-FLIGHT MEASUREMENT IN WLAN

CROSS REFERENCE TO RELATED APPLICATIONS

This application is related to and claims priority from U.S. Provisional Patent Application No. 62/099,476 filed Jan. 3, 2015, which is incorporated herein by reference in its entirety.

FIELD

Embodiments disclosed herein relate generally to positioning methods and apparatus and more specifically to positioning in wireless local access network (WLAN) environments.

BACKGROUND

Navigation systems, autonomous driving and safety applications in vehicular and other mobile environments require high-accuracy positioning. The commonly used global navigation satellite system (GNSS) positioning is inherently limited when the sky is obstructed, for example in deep urban canyons or in underground parking lots. Compensation for lack of GNSS availability or degraded performance to maintain positioning may be performed with a Dead-Reckoning ("DR") algorithm using sensors, but the positioning accuracy is severely degraded.

Known WLAN usage does not include high-accuracy ranging. Vehicular safety applications goals for positioning (distance and location) include a goal of lane level accuracy, i.e. sub-meter error. This goal translates into a 3.2 nanosecond (ns) maximal time measurement error, which is challenging when considering that WLAN is a low-cost technology without high accuracy clock synchronization.

Mechanisms for time-of-flight (ToF) measurement are known. For example, "Wireless Positioning Technologies and Applications" by Alan Bensky. Artech House, 2007, (hereinafter "Bensky") describes a method that uses unformatted orthogonal frequency divisional multiplexed (OFDM) symbols to measure distance between a reference point and a mobile unit (e.g. a vehicle). Other publications such as "Measuring Round Trip Times to Determine the Distance between WLAN Nodes" by Andre Gunther and Christian Hoene in NETWORKING 2005: Networking Technologies, Services, and Protocols; Performance of Computer and Communication Networks; Mobile and Wireless Communications Systems pp 768-779, (hereinafter "GH") describe round-trip-time (RTT) measurements based on sampling of packet transmit and receive events.

The models described by Bensky do not consider the complex mitigation of multipath errors. Gunther and Hoene attempt to develop schemes to minimize the impact of such errors but the inherent error is still far higher than required. Thus, known TOF-based methods for obtaining accurate positioning suffer from significant disadvantages.

ToF is measured by a time measurement unit. The principle of operation of a time measurement unit is described by multiple articles, including by GH, which suggests 1 µs accuracy, achievable with common WLAN modems. As mentioned, the maximal required error of 3.2 ns renders this 1 µs accuracy irrelevant. A single clock cycle is used for measurement. The clock cycle duration is a function of the channel bandwidth. For a 10 MHz channel as commonly utilized in IEEE 802.11p, the clock cycle is 100 ns, which translates to 30 meters accuracy. Accordingly, there is a need to provide a high-quality positioning solution (in particular for IEEE 802.11p) and therefore a time measurement unit alone, without supporting mechanisms, does not meet the accuracy goal. Known WLAN modems have to be modified (enhanced) to enable the required high accuracy positioning measurement.

SUMMARY

Aspect of embodiments disclosed herein relate to methods, systems and apparatus for accurate positioning of one WLAN node relative to another WLAN node, i.e. to accurate relative positioning between two WLAN nodes. Exemplarily, both nodes may be mobile, or one node may be mobile and the other stationary. Exemplarily, the WLAN nodes may be associated with vehicles. Exemplarily, a stationary WLAN node may be a fixed road-side unit (RSU), which has a known accurate position or location. Alternatively, moving WLAN nodes may also refer to other entities such as drones.

The following description uses the terms "initiator node" (or "ego node") and "target node" (or "remote node"), with reference to nodes of a WLAN. For simplicity, "initiator node" is referred to sometimes as "initiator", and "target node" is referred to sometimes as "target". "Initiator" refers to an entity (i.e. a vehicular or drone WLAN unit) that measures distance to a target and calculates position. All positioning calculations disclosed herein are initiated and done by initiators.

The term "relative positioning" is used throughout this description to refer to a distance and, optionally, to an angle between two WLAN nodes, an initiator node and a target node. The relative positioning is obtained without considering GNSS positioning, i.e. without using any GNSS reading. The WLAN nodes may receive GNSS signals, but such signals are not used in their relative positioning.

The term "absolute positioning" is used throughout this description to refer to the positioning of an initiator node at an absolutely known point in a given coordinate system at a given moment. The absolute positioning is obtained using an initiator GNSS reading and a known relative position to a fixed node that has accurate position. The fixed node is exemplarily an RSU, acting as target. The RSU transmits its position to the initiator node, which also obtains its own GNSS reading. The combining of the reported RSU position with the initiator GNSS reading can be performed in various ways that should be known to one of ordinary skill in the art.

In exemplary embodiments, there are provided methods for obtaining positioning of nodes in a WLAN, comprising the steps of: by an initiator node of the WLAN, calculating a compensated time-of-flight (ToF) of messages exchanged between the initiator node and a target node and calculating a position of the target node relative to the initiator node using the compensated ToF, thereby obtaining relative positioning between the initiator and target nodes. The term "compensated ToF" is defined and explained below. The relative positioning between the initiator and target nodes is obtained without use of a GNSS input. The calculation of the compensated ToF includes calculating a compensated ToF value using a target OFDM slope value obtained at the target node. Exemplarily, the target OFDM slope value is obtained while compensating for multipath effects. The target OFDM slope value is transmitted to the initiator node in an update message. The calculation of the compensated ToF further includes calculating the compensated ToF value using an initiator OFDM slope value obtained at the initiator node. Exemplarily, the initiator OFDM slope value is obtained while compensating for multipath effects.

In some exemplary embodiments, the initiator node and the target node are on-board mobile units (OBUs). In other exemplary embodiments, the initiator node is an OBU and the target node is a stationary unit. In some exemplary embodiments, the target node is a RSU with a known absolute position and a method further comprises the step of calculating an absolute position of the initiator node using an initiator GNSS reading as input and the relative positioning.

In an exemplary embodiment there is provided a system for obtaining positioning of nodes in a WLAN, comprising a first enhanced WLAN unit associated with a first node, a second enhanced WLAN unit associated with a second node, wherein each of the first and second enhanced WLAN units is adapted to calculate a compensated ToF of messages exchanged with the other node, and a first position calculation unit associated respectively with the first node and configured to calculate a position of the second node relative to the first node using the compensated ToF, thereby obtaining relative positioning between the first and second nodes. An enhanced WLAN unit may further include an OFDM symbol slope measurement and calculation unit adapted to measure and calculate a phase slope over all subcarriers of the OFDM symbol while compensating for multipath effects and a WLAN modem having an enhanced WLAN transmitter adapted to add the phase slope to the OFDM subcarriers and to transmit the OFDM phase slope. The phase slope may be calculated iteratively. The first node and the second node may be mobile OBUs. One node may be a fixed node, such as a RSU. In an embodiment, the first node is may be further configured to calculate a respective absolute position of the first node using a GNSS input and a compensated ToF obtained in messages exchanged with the RSU.

In an embodiment there is provided a WLAN unit included in a node of the WLAN, comprising an OFDM slope measurement and calculation unit adapted to measure and calculate a phase slope over all subcarriers of an OFDM symbol while compensating for multipath effects, an enhanced WLAN modem with an enhanced transmitter and an enhanced receiver, the transmitter adapted to optionally add the phase slope to the OFDM symbol subcarriers and to transmit the result to a similar WLAN unit included in another node of the WLAN, and the receiver adapted to measure a ToF using time and phase slope, and a WLAN control unit for controlling the WLAN modem operation and for calculating a compensated ToF that may be used for relative positioning of the two WLAN nodes. The WLAN unit may further comprise a symbol selection unit for selecting a received most suitable symbol for processing.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals.

FIG. 10A—perfect agreement (no ambiguity); FIG. 10B—low ambiguity due to high GNSS error; FIG. 10C—moderate agreement; and FIG. 10D—high disagreement.

DETAILED DESCRIPTION

In embodiments disclosed herein, methods (or "schemes") for calculating orthogonally frequency domain multiplexing (OFDM) slope of phase measured over at least a subset of OFDM subcarriers, multipath mitigation and ToF are combined with inventive schemes for sending update messages from a target to an initiator to provide high quality accurate positioning (both relative and absolute). The update messages, described in more detail below, include a time measurement of the target and are sent to the initiator in an efficient manner. Although methods, systems and apparatus disclosed herein are applied in WLAN (and in particular in vehicular WLAN), they can be applied in peer-to-peer OFDM wireless networks based on other communication protocols. Hereinafter, "OFDM symbol slope", "OFDM slope" or just "slope" are used interchangeably.

Figure 1A:
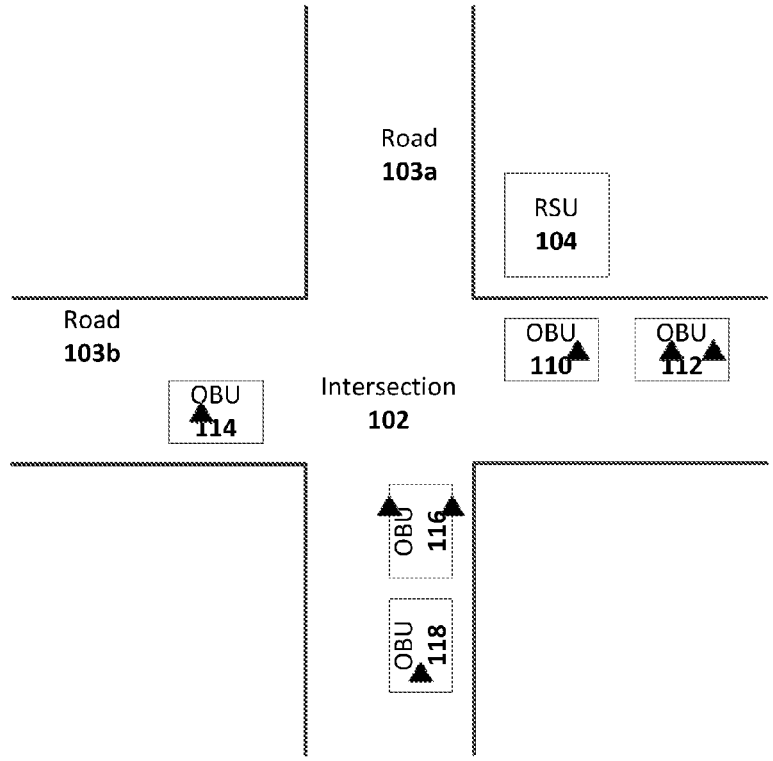
FIG. 1A illustrates schematically a system for positioning disclosed herein.

FIG. 1A illustrates schematically a system for accurate relative positioning disclosed herein. The figure shows an intersection 102 between two roads 103a and 103b, the roads having thereon five on-board-units (OBUs) placed inside respective vehicles numbered 110, 112, 114, 116 and 118. Locations of antennas in each vehicle are marked by respective triangles. Vehicles 110, 114 and 118 have a single antenna. Vehicle 112 has two antennas, exemplarily one at a shark-fin and one at the front windshield. Vehicle 116 has two antennas placed exemplarily at two side mirrors. Note that in general, more than two antennas may be placed on a vehicle (referred to then as "multiple antennas"). The positions of the two antennas in vehicles 112 and 116 are exemplary and not limiting. In general, any constellation of two (or more) antennas can be used for purposes set forth herein.

GNSS reception is limited at the intersection 102. A RSU 104 positioned exemplarily next to the intersection serves as a fixed positioning reference. The RSU is stationary. Typically, the RSU is placed on a high pole, for example on top of a traffic light, to have a direct line-of-sight (LOS) toward most vehicles for accurate measurement. Each OBU and the RSU include an enhanced WLAN unit (described in detail with reference to FIG. 2).

Each OBU (as initiator) can measure a relative distance to another OBU (as target) to obtain relative positioning, i.e. the position of the respective target relative to the respective initiator. Each OBU can also measure a respective distance to RSU 104 to obtain its own accurate (and absolute) position. Vehicles 112 and 116 (with more than one antenna) are capable of estimating respective angles to the RSU. Since the distance (as well as the angle in the case of multiple antennas) of each vehicle to the RSU is known, the precise (and absolute) location or position of such vehicles (when acting as initiators) can be calculated.

Figure 1B:
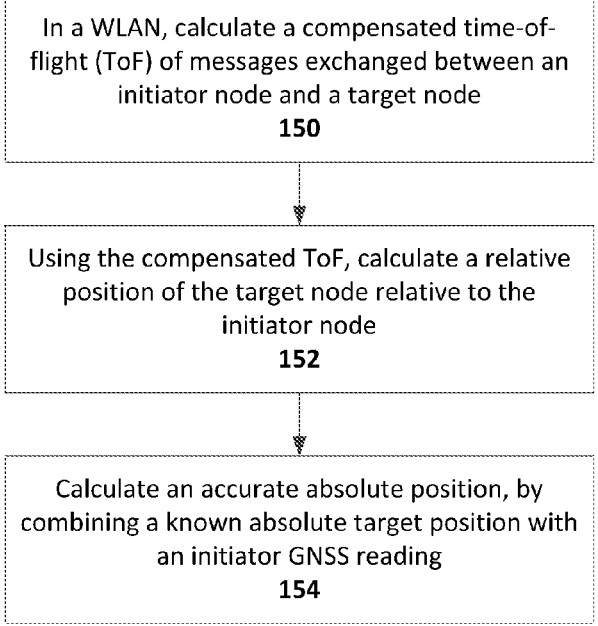
FIG. 1B shows schematically in a flow chart an embodiment of a method for positioning disclosed herein.

FIG. 1B shows schematically in a flow chart an embodiment of a method for positioning disclosed herein. In step 150, an initiator exchanges messages with a target and calculates a compensated ToF (defined below), as described in more detail below. The compensated ToF calculation uses initiator and target OFDM slope inputs. In step 152, the initiator calculates a position of the target relative to its own position using the compensated ToF. Optionally, in step 154, knowing the absolute position of a fixed target (e.g. an RSU), the initiator calculates an accurate absolute position for itself, by combining a known absolute target position with an initiator GNSS reading.

Figure 1C:
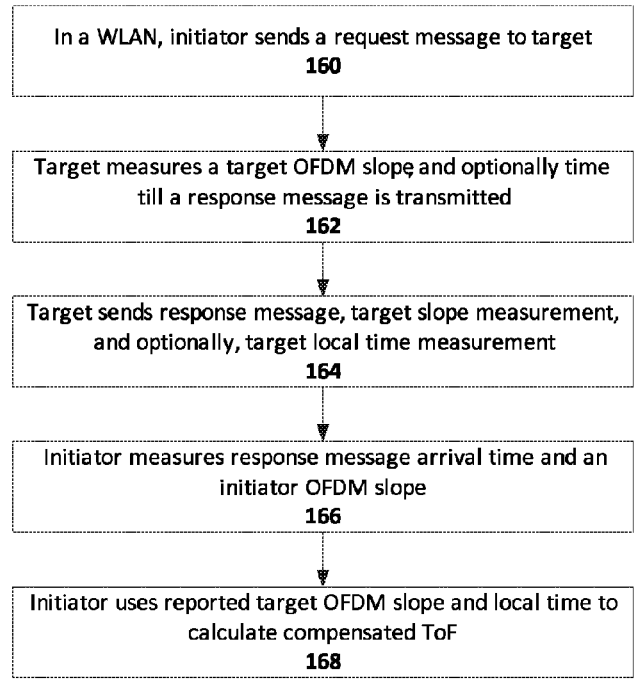
FIG. 1C shows schematically sub-steps of steps 150 and 152 in FIG. 1B.

FIG. 1C shows schematically sub-steps of steps 150 and 152. In step 160, the initiator sends a request message to a specific target at a sending time. A time measurement is started by the initiator from the sending time. In step 162, the target measures a "target" OFDM slope. The OFDM slope measurement is described in more detail below. In step 164, the target sends the initiator a response message with the target OFDM slope value and, optionally, information on a delay until the response packet is transmitted, in case the delay is not deterministic. In step 166, the initiator measures the arrival time of the response message and measures an "initiator" OFDM slope. In step 168, the initiator uses the reported target OFDM slope value, the measured initiator OFDM slope and, optionally, the target local time to calculate the compensated ToF in step 168.

Figure 2:
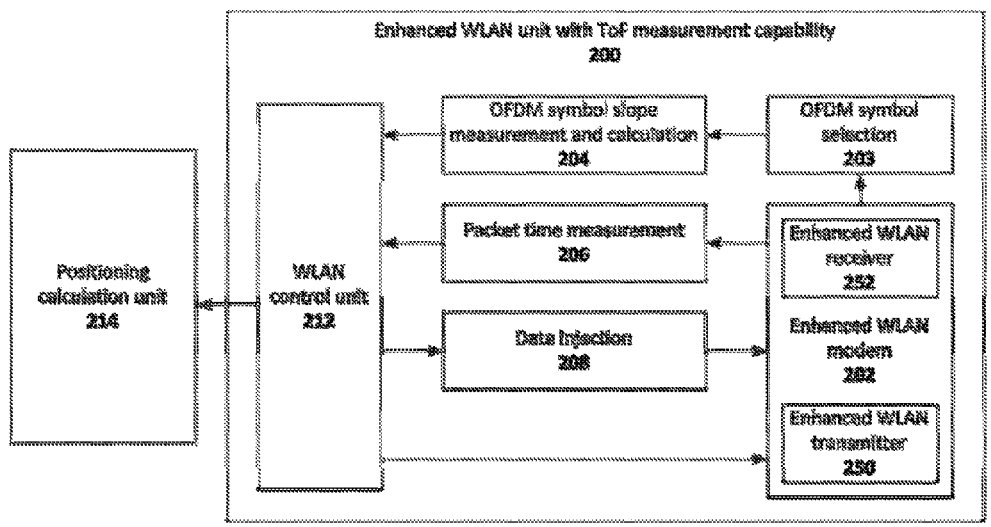
FIG. 2 illustrates an enhanced WLAN unit with TOF measurement capability according to an embodiment disclosed herein.

A WLAN unit 200 adapted to accurately measure TOF and included in each OBU and in the RSU is illustrated schematically in FIG. 2. The arrows indicate the direction of data flows. WLAN unit 200 is adapted to measure and provide accurate relative positioning. In case of multiple (e.g. two) antenna vehicles, the relative distance between two antennas on a given vehicle is measured to facilitate angle estimation. Because of its enhanced functionality and added new components (described next), WLAN unit 200 is an "enhanced" WLAN unit. WLAN unit 200 includes an enhanced WLAN modem 202 with an enhanced transmitter 250 adapted to add phase slope to subcarriers, and an enhanced receiver 252 modified to support interfaces to new added units or "modules" implementable in software (SW), hardware (HW), or a combination of SW and HW (203 to 212, see below). WLAN unit 200 further includes an OFDM symbol selection unit 203, an OFDM symbol slope measurement and calculation unit 204, a packet time measurement unit 206, an optional data injection unit 208, an optional OFDM symbol slope injection unit (not shown but included in enhanced transmitter 250) and a WLAN control unit 212. The OFDM symbol slope injection unit is adapted to control the transmitted OFDM symbol slope (and provides a slope value 310, FIG. 3). OFDM symbol selection unit 203 optionally selects the most suitable symbol during packet reception for processing. This unit is used only when the OFDM equalization is performed throughout the packet, as commonly performed in IEEE802.11p implementations. OFDM symbol slope measurement and calculation unit 204 measures the phase slope over all subcarriers of the OFDM symbol, accounting for multipath-combating mitigation. Packet time measurement unit 206 measures packet transmission and reception times. Data injection unit 208 is adapted to change packet content during transmission. It requires a central processing unit (CPU, not shown) with real-time control of the memory map (not shown) and knowledge of the transmitted packet descriptor. Note that a typical WLAN driver does not support this functionally. A typical WLAN modem can only write complete messages or delete messages, but cannot modify content of specific bytes inside a message.

Note that while Bensky describes in principle the operation of a slope calculation unit, neither Bensky nor others provide a detailed explanation of multipath mitigation. Such functionality is added in OFDM symbol slope measurement and calculation unit 204.

WLAN control unit 212 controls the WLAN modem operation, exchanges information between the initiator and target and calculates the compensated ToF and, in case of multiple antennas, also the angle. The measured TOF and (optionally) the angle are fed to a positioning calculation unit 214 configured to calculate relative positioning, absolute positioning, or both relative and absolute positioning. Unit 214 is included in each OBU and in the RSU, but is external to the WLAN unit.

Figure 3:
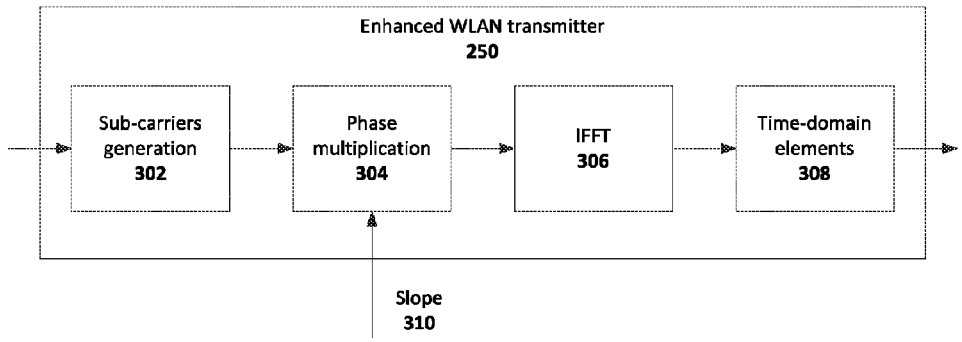
FIG. 3 illustrates an enhanced WLAN transmitter with slope injection capability according to an embodiment disclosed herein.

Enhanced transmitter 250 is described in detail with reference to FIG. 3. A typical known transmitter includes a subcarrier generation unit 302, an inverse Fast Fourier Transform (IFFT) unit 306 for converting the frequency domain subcarriers to time-domain, and time-domain elements 308 such as a filter for shaping signal RF up-conversion. The transmitted enhancements are composed from a slope input 310, which is multiplied by the subcarrier index, with the result added to the subcarrier phase in a phase multiplication unit 304. Note that known WLAN units do not include any components similar or equivalent to OFDM symbol slope injection unit 210 and phase multiplication unit 304.

Figure 4:
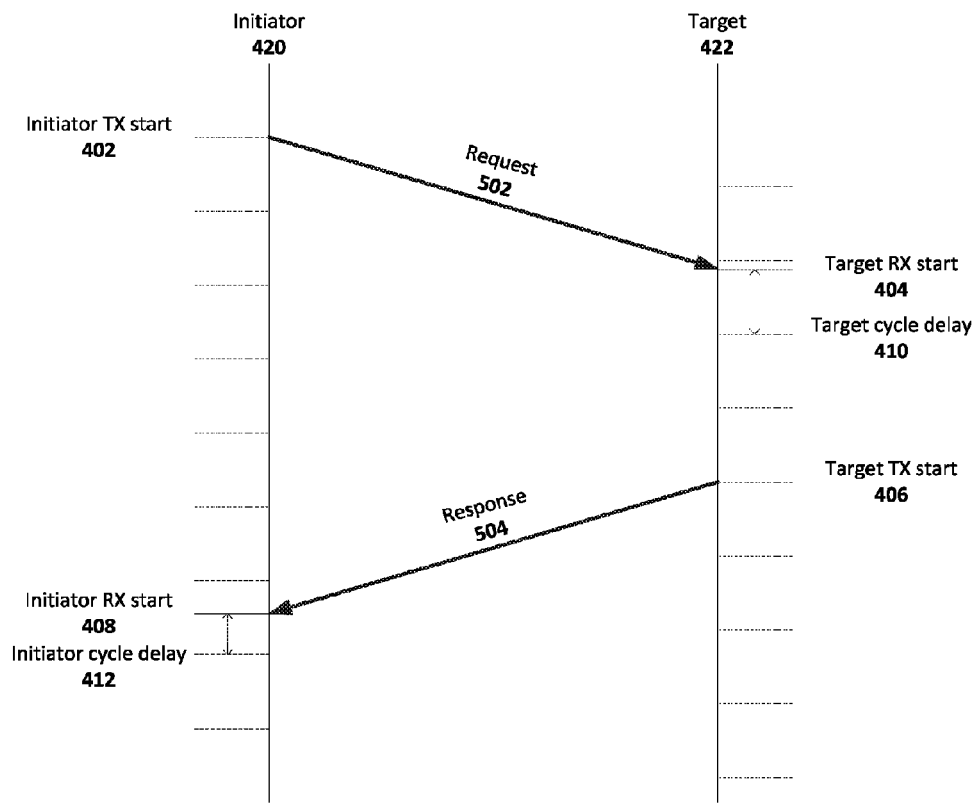
FIG. 4 illustrates a TOF timing model according to an embodiment disclosed herein.

An exemplary ToF timing diagram is described in FIG. 4. The left side of the diagram describes the actions of an initiator 420 (typically an OBU, but not always: for example, the initiator may be a drone) that initiates the measurement. The right side of the diagram describes the actions of a target 422, typically an RSU but possibly also an OBU (the latter for example in the relative positioning case). The dashed lines represent clock cycles, to which internal operation of each node is aligned. The clock cycles are not synchronized between the initiator and target. Transmit operation begins at clock cycle boundary.

The initiator starts transmission at time 402 with a request 502, which may be a dedicated request message or a common message enhanced as request. The packet is received by the target at a later time 404, due to the propagation time of the request message over-the-air. The target responds with a response 504 and starts transmission at time 406. Variants of the response are described with reference to FIGS. 5A-5D. The transmission is received by the initiator at time 408, similarly delayed by a propagation time of the response message over-the-air. The two propagation times add up to a "nominal" ToF. Time measurement unit 206 (in both the initiator and the target) is synced to clock cycle, meaning that packet reception by the initiator will be detected only at time 412. However, the actual round-trip ToF is shorter than the nominal ToF above, as the measurements add the clock phase differences at packet reception start and packet transmission (time 410-time 404) and similarly the detection delay at initiator side (time 412-time 408). Therefore, the nominal ToF measurement is compensated by decreasing from measured time 412 the added delays, i.e. the time delay expressed by time 410-time 404 and the time delay expressed by time 412-time 408. This procedure yields a "compensated ToF". The time delays are provided by OFDM symbol slope calculation unit 204. The compensated ToF (also referred to as round trip time or "RTT") is equal to the difference between the time delay expressed by the difference (time 408-time 402) and the time delay expressed by the difference (time 406-time 404).

The target needs to communicate its local OFDM slope measurement (time 410-time 404) to the initiator in order to complete the calculation of the compensated ToF. Three different communication protocols for providing the target slope measurement are described with reference to FIGS. 5A-D.

Figure 5A:
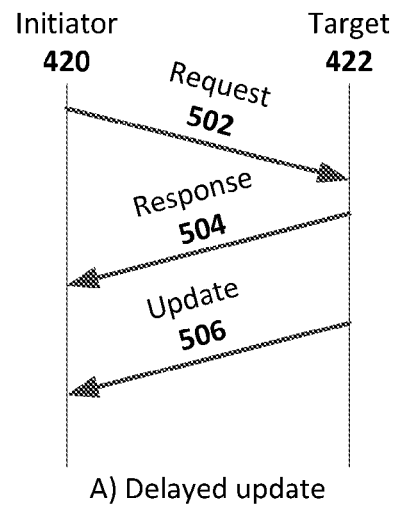
FIG. 5A illustrates an exemplary communication protocol for slope measurement update, according to an embodiment disclosed herein.

A first communication protocol ("delayed response") is shown in FIG. 5A. An additional update message 506 is sent by the target following a response message 504. The update message includes the target slope measurement. This protocol follows common timing synchronization protocols.

Figure 5B:
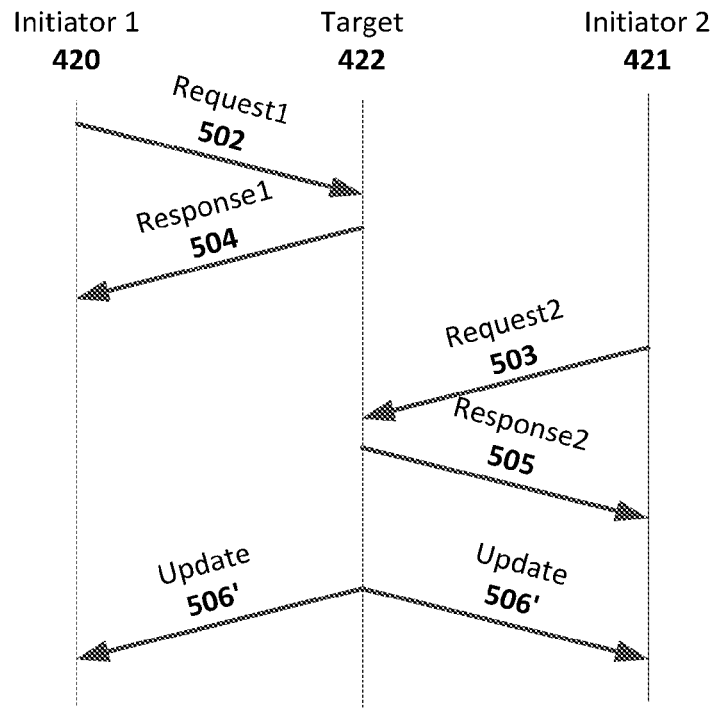
FIG. 5B illustrates a variant of the communication protocol of FIG. 5A.

A potential enhancement to the protocol of FIG. 5A is shown in FIG. 5B, which shows communication exchanges between initiator 420 (referred to also as "node 1") and a second initiator 421 (referred to also as "node 2") and target 422. Request1 and Response1 are exchanged between initiator 1 and the target, while Request2 (503) and Response2 (505) are exchanged between initiator 2 and the target. Multiple (in this case two) updates are aggregated to save bandwidth into a single broadcast message 506' that includes the target slope measurements for both initiator 1 and initiator 2 (and potentially more nodes). Network utilization is improved.

Figure 5C:
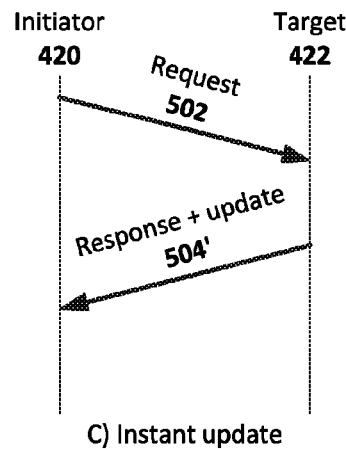
FIG. 5C illustrates yet another communication protocol for slope measurement update, according to an embodiment disclosed herein.

A second communication protocol ("instant update") is shown in FIG. 5C. The process is unique since a response message 504' from the target is modified on-the-fly to include the measured slope data. Data injection unit 208 facilitates this functionality. The advantage over method A is clear. Standalone update message 506 is eliminated to reduce network load.

Figure 5D:
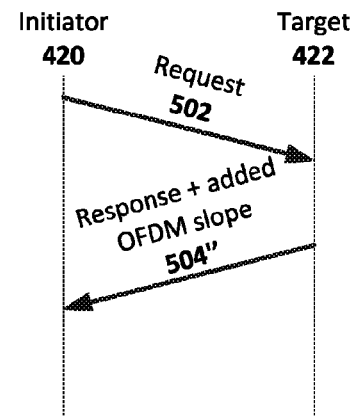
FIG. 5D illustrates yet another communication protocol for slope measurement update, according to an embodiment disclosed herein.

A third communication protocol ("implicit update") is shown in FIG. 5D. A response message 504" includes implicitly the measured slope data. Instead of injecting data, the target transmission injects the slope value measured at the target. With that, the initiator can use the received measured slope "as is", because the received measured slope is the sum of the initiator and target measurements. Slope injection unit 210 fulfills a key role in this communication protocol. Similarly to communication protocol B, standalone update message 506 (or 506') is eliminated. The advantage over communication protocol B is avoiding the need to modify a data field in the response message, which might impact packet security and integrity. A CTS/RTS handshake can be used, because the returned CTS message can include the update even without any data field. Usage of CTS/RTS is optimal from a network perspective, since no additional packets need to be defined for the operation.

Figure 6:
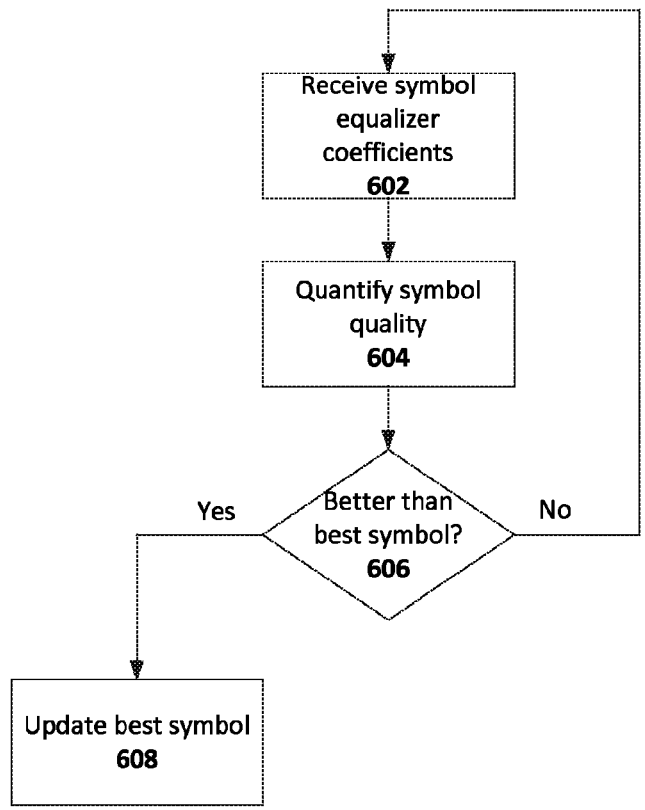
FIG. 6 illustrates a flow diagram of symbol selection, according to an embodiment disclosed herein.

OFDM symbol selection performed by OFDM symbol selection unit 203 is illustrated in FIG. 6. The selection operates on each symbol, and it is reset when a new packet begins by erasing the "best symbol" field. The goal is to pick the symbol that will likely yield the most accurate estimation of time. Operation begins in step 602, when new equalizer coefficients are received for the current symbol. In step 604, the symbol quality is quantified. Several quantification criteria may be applied, for example average energy or average energy of lowest 8 subcarriers. That is and exemplarily, "average energy" becomes the symbol quality value. The criteria should prefer symbols with lower or less-severe fading than the fading of other symbols in same packet. The quality of the current symbol is compared with the quality of the best one, i.e. with the value of the highest average energy amongst all previous symbols in step 606, and if the quality improved (i.e. if the current value is better), then the best symbol is updated and receives the value of the current one in step 608. The updated best symbol is then used in the slope calculation.

Figure 7:
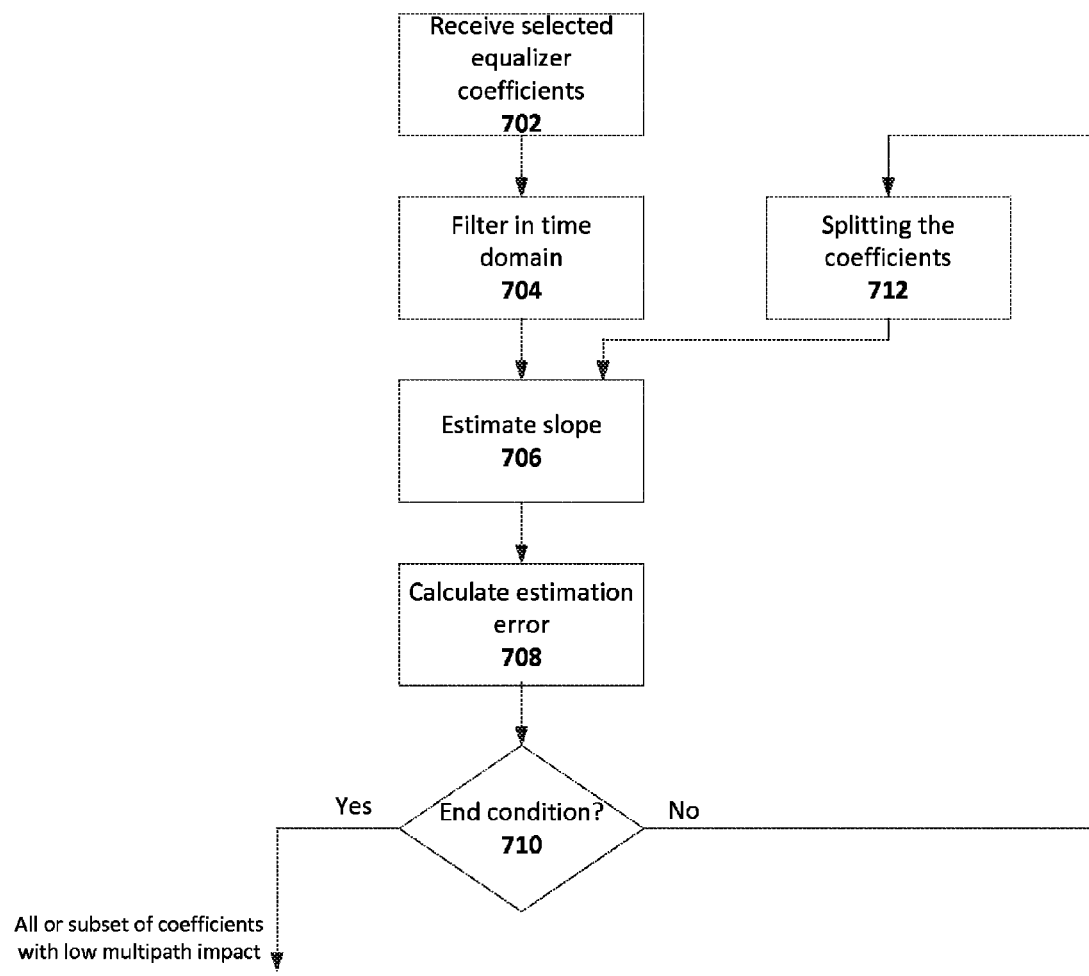
FIG. 7 illustrates a flow diagram of slope calculation, according to an embodiment disclosed herein.

Details of the slope measurement and calculation process performed by OFDM symbol slope calculation unit 204 are illustrated in a flow chart in FIG. 7. The process provides a reliable estimation of the slope phase and of the estimation reliability in the presence of multipath. Operation begins in step 702 with the arrival of symbol equalizer coefficients. In some embodiments, these coefficients may be updated best symbol equalizer coefficients from step 608. In other embodiments, the coefficients may be of just the first symbol. Preferably, all coefficients of all subcarriers (52 in the IEEE 802.11p case) are used in the calculation. The coefficients are complex numbers. In step 704, the result of the operation performed on the equalizer coefficients in step 702 is optionally filtered in the time domain. Although being an optional step, its performance decreases the amount of interferers, and as such improves the result accuracy. The filtering is performed by converting the channel response to the time domain, by applying a FFT followed by zeroing all far and small reflections, for example, all reflections that are 50 m away from the main path, and their amplitude is lower by more than 8 dB of the strongest path. The filtering ends by converting back the time domain response to the frequency domain by applying IFFT.

Slope is estimated in step 706 in the frequency domain. There are several methods of estimation. The straightforward one is to apply an angle function. The phase spans beyond 2pi range, hence an unwrap function needs to be applied. Since unwrap is an estimation by itself, some errors can occur at this stage. The linear slope can be estimated by applying Weighted Least Squares (WLS), where the weight is the SNR of each subcarrier. Subcarriers which are subject to deep fading have unreliable angle and low SNR, hence are ignored. The problem is that unwrap function considers those subcarriers as well, but this problem is overcome in step 712. Another estimation method considers both amplitude and phase of the main path, thus using more data for the estimation process for yielding more accurate result. The operation can be enhanced to concurrently apply multiple estimation methods, and select the one with lower residual error.

The residual error is calculated in step 708. This step is used to determine the reliability of the result, and can even lead to completely discarding it and declaring the measurement as an "outlier". The process is iterative, with at least one iteration performed if multipath is present. The error is calculated between the input values (step 702) and the estimation (the slope that can be used to artificially build subcarriers and compare those with the actual input values). Step 710 checks the end condition. If the error is lower than a certain first threshold ("Yes"), then the result is satisfactory, and operation can end. If the error is higher than a certain second threshold (also "Yes"), then input is too challenging, results cannot be improved, and operation ends as well. The final condition is non-decreasing error after the most recent iteration. If the stop conditions were not met ("No"), the operation continues from step 712. The subcarrier coefficients are split around the area of deep fading which is detected by low SNR and slope inconsistency. That is, some of the OFDM subcarriers may have low-energy and are therefore unusable and some show inconsistent slope of phase. Those subcarriers are ignored in the calculation. The coefficients are split into sub-groups, where the "bad" subcarriers are eliminated, with one sub-group ending before the eliminated sub-group and another sub-group starting after the eliminated subgroup. For example, if the energy of inputs [8:10] is less than 10 dB of the average input energy, then the input is split to two sequences [1:7] and [11:52]. Each sequence is processed independently by repeating step 706 and the following ones. The error from deep fading (a significant drop in the subcarrier energy) is thus avoided.

Figure 8:
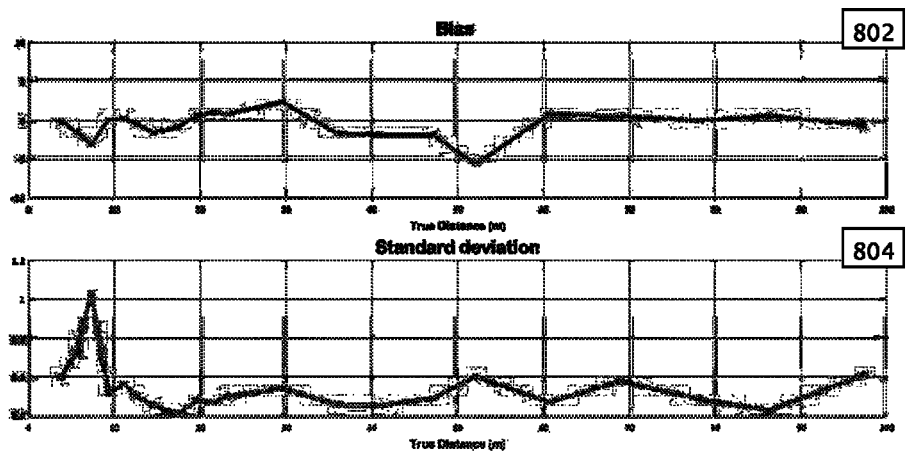
FIG. 8 illustrates exemplary results of relative positioning enhancement according to an embodiment disclosed herein.

FIG. 8 illustrates exemplary results of relative positioning enhancement according to an embodiment disclosed herein. The X axis shows the distance between the initiator and the target in meters, and Y shows the error in meters. The presented results were measured in a parking lot, where the magnitude of multipath and number of reflectors are very high. Top graph 802 shows measurement bias, while bottom graph 804 shows measurement standard deviation vs. the distance between the RSU and the mobile unit (i.e. the target and initiators). It can be seen that at most distances, an error of 1 m is achievable. Some distances between initiator and targets suffer from higher multipath or more severe fading, and error increases, yet it is bounded at 5*m*.

Figure 9:
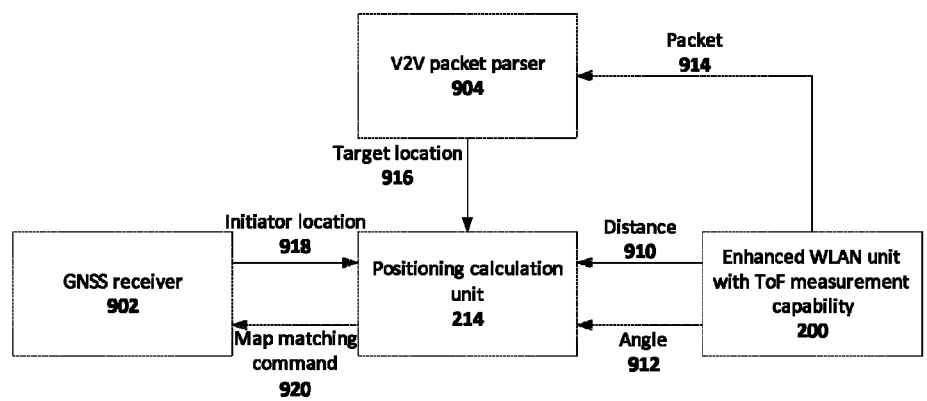
FIG. 9 illustrates an embodiment of a system including a positioning calculation unit disclosed herein.

FIG. 9 describes a system performing the positioning calculation in more detail. WLAN unit 200 (with ToF measurement capability) provides a distance measurement 910 and, optionally, an angle 912 when two or more antennas are available. A packet 914 is parsed in a vehicle-to-vehicle (V2V) packet parser 904. The V2V packet parser implements the V2V protocol stack according to a given specification and provides a target location 916. A GNSS receiver 902 may provide (see e.g. FIG. 10A) an initiator location, an estimated error of the initiator location in ellipsoid format, an ego-heading and potentially an ego-heading estimated error 918. Note however that, advantageously, no GNSS input is needed to perform absolute and/or relative positioning according to some method embodiments disclosed herein. That is, in some cases the GNSS receiver is not used. Optionally, the calculation unit can force the GNSS receiver to set a positioning by applying a map matching command 920.

Typically, positioning calculation unit 214 uses a Kalman filter. The filter estimates the distance and speed. More advanced filters also estimate the angle from the RSU, especially if the angle is known as in case of multiple antennas. Such filters are known in the art, and used for example in radar technology.

Figure 10A:
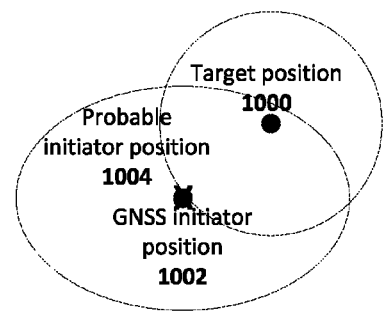
FIGS. 10A-10D illustrate various degrees of disagreement and ambiguity between a GNSS reading and a measured distance of an initiator node from a known target node.
Figure 10B:
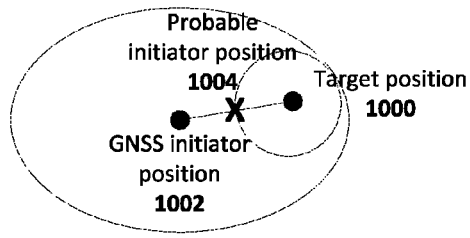
Figure 10C:
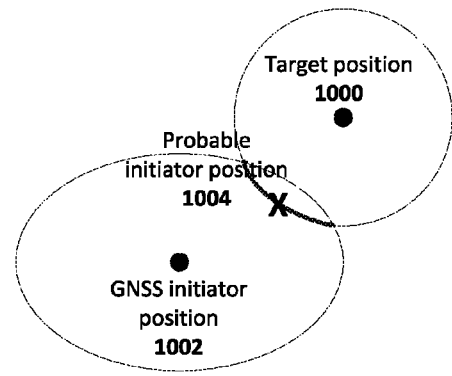
Figure 10D:
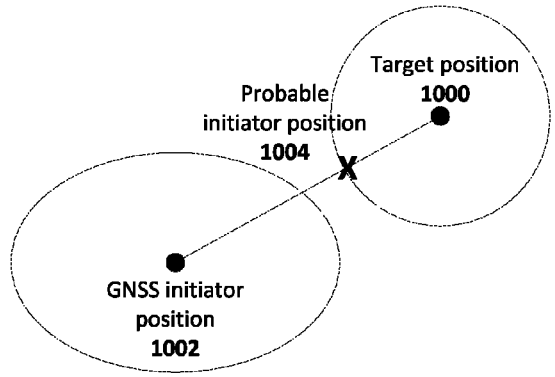

FIGS. 10A-10D illustrate various degrees of disagreement and ambiguity between a GNSS reading and a measured distance of an initiator node from a known target node. FIG. 10A shows perfect agreement (no ambiguity), FIG. 10B shows low ambiguity due to high GNSS error, FIG. 10C shows moderate agreement and FIG. 10D shows high disagreement.

The single GNSS reading (positioning value) may be inaccurate. A high inaccuracy in the GNSS reading leads to multiple possible GNSS locations within an error margin. The error of the angle estimation between initiator and target can be calculated from the distribution of possible points from all possible GNSS locations. The figures illustrate various cases of disagreements between the GNSS reading and the measured distance of an initiator node from a known target node (e.g. the RSU) and how distance of an initiator node from a known target node (the RSU) can assist to obtain absolute position of the initiator node. A cross point 1004 on the circle with radius equal to the measured distance between a virtual line connecting an initiator location 1002 as reported by GNSS and an RSU position 1000 is the most probable location of the initiator and hence the most probable angle. Obviously, the calculation of the angle variance from the distribution of possible points from all possible GNSS locations is too complex, and can be simplified by using two parameters:

1) GNSS error: the higher the error, the lower the GNSS location reliability and the less reliable the angle estimation.

2) Distance from the GNSS estimated location: the smaller the distance, the more reliable the angle estimation.

The error of angle estimation can be formulated as, when angle is measured in degrees:

Angle variance=$M1$*GNSS error+$M2$*distance from GNSS estimated location.

The angle variance is used in exemplarily a Kalman filter, where each parameter is associated with a reliability indication. An exemplary value for M1 may be 4. For example, if the GNSS error is 1.5 m, then the estimated angle has a 6° error, and when the GNSS error is 20 m, then the angle error is 80°. M2 could exemplarily be 4 as well.

FIG. 10A shows perfect alignment between GNSS initiator location 1000 and the most probable location of the initiator 1004. In this scenario, the estimated error is low, depending on the GNSS initiator location estimation error. FIG. 10B shows a more likely scenario where the GNSS error is so high that the ellipse covers all potential locations in the radius around the RSU. The angle estimation error is high and the estimated value of the angle is almost unusable. In practice, this scenario is reasonable only after the scenario of FIG. 10C occurred, in which the circles and ellipses of RSU and GNSS have partly overlapped to allow some estimation. FIG. 10D shows another challenging scenario, in which the circles and ellipses do not overlap at all. Obviously, the error is high, and preferably estimation based on this scenario should be avoided if possible.

Note that while heading of the GNSS reading can be used as well in the filter, it usually drifts significantly when the GNSS is inaccurate.

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

All references mentioned in this specification are herein incorporated in their entirety by reference into the specification, to the same extent as if each individual patent was specifically and individually indicated to be incorporated herein by reference. In addition, citation or identification of any reference in this application shall not be construed as an admission that such reference is available as prior art to the present application.

What is claimed is:

1. A method for obtaining positioning of nodes in a wireless local access network (WLAN), comprising the steps of: by an initiator node of the WLAN:
   a) calculating a compensated time-of-flight (ToF) of messages exchanged between the initiator node and a target node; and
   b) calculating a distance of the target node relative to the initiator node using the compensated ToF, thereby obtaining relative positioning between the initiator and target nodes.

2. The method of claim 1, wherein the relative positioning between the initiator and target nodes is obtained without use of a global navigation satellite system (GNSS) input.

3. The method of claim 1, wherein the step of calculating a compensated ToF includes calculating a compensated ToF value using a target orthogonally frequency domain multiplexed (OFDM) slope value obtained at the target node.

4. The method of claim 3, wherein the target OFDM slope value is obtained while compensating for multipath effects.

5. The method of claim 3, wherein the target OFDM slope value is transmitted to the initiator node in an update message.

6. The method of claim 3, wherein the step of calculating a compensated ToF further includes calculating a compensated ToF value using an initiator OFDM slope value obtained at the initiator node.

7. The method of claim 6, wherein the initiator OFDM slope value is obtained while compensating for multipath effects.

8. The method of claim 1, wherein the initiator node and the target node are mobile on-board units.

9. The method of claim 1, wherein the initiator node is a mobile on-board unit and wherein the target node is a stationary unit.

10. The method of claim 9, wherein the target node is a road-side unit (RSU) with a known absolute position, the method further comprising the step of:
   c) calculating an absolute position of the initiator node using an initiator global navigation satellite system (GNSS) input and the relative positioning.

11. The method of claim 10, wherein the step of calculating a compensated ToF further includes calculating a compensated ToF value using an initiator OFDM slope value obtained at the initiator node.

12. The method of claim 11, wherein the initiator OFDM slope value is obtained while compensating for multipath effects.

13. A system for obtaining positioning of nodes in a wireless local access network (WLAN), comprising:
   a) a first enhanced WLAN unit associated with a first node;
   b) a second enhanced WLAN unit associated with a second node, wherein each of the first and second enhanced WLAN units is adapted to calculate a compensated time-of-flight (ToF) of messages exchanged with the other node; and
   c) a first position calculation unit associated respectively with the first node and configured to calculate a distance of the second node relative to the first node using the compensated ToF, thereby obtaining relative positioning between the first and second nodes.

14. The system of claim 13, wherein each enhanced WLAN unit includes an orthogonally frequency domain multiplexed (OFDM) symbol slope measurement and calculation unit adapted to measure and calculate a phase slope over all subcarriers of the OFDM symbol while compensating for multipath effects.

15. The system of claim 14, wherein each enhanced WLAN unit further includes a WLAN modem having an enhanced WLAN transmitter adapted to add the phase slope to the OFDM subcarriers and to transmit the OFDM phase slope.

16. The system of claim 13, wherein adaptation of the enhanced WLAN transmitter to measure and calculate the phase slope while compensating for multipath effects includes adaptation to calculate the phase slope iteratively.

17. The system of claim 13, wherein the first node and the second node are mobile on-board units.

18. The method of claim 13, wherein the first node is a mobile on-board unit and wherein the second node is a stationary unit.

19. The system of claim 18, wherein the second node has a known absolute position, and wherein the position calculation unit associated with the first node is configured to calculate a respective absolute position of the first node using a first node global navigation satellite system (GNSS) input and a compensated ToF obtained in messages exchanged with the second node.

20. A wireless local access network (WLAN) unit included in a node of a WLAN, comprising:
   a) an orthogonally frequency domain multiplexed (OFDM) slope measurement and calculation unit adapted to measure and calculate a phase slope over all subcarriers of an OFDM symbol while compensating for multipath effects;
   b) an enhanced WLAN modem with an enhanced transmitter and an enhanced receiver, the transmitter adapted to optionally add the phase slope to the OFDM symbol subcarriers and to transmit the result to a similar WLAN unit included in another node of the WLAN, and the receiver adapted to measure a time-of-flight (ToF) using time and phase slope; and
   c) a WLAN control unit for controlling the WLAN modem operation and for calculating a compensated ToF that may be used for relative positioning of the two WLAN nodes.

* * * * *